Nov. 3, 1959  M. CICALA  2,910,800

FISHING LURE

Filed Sept. 9, 1957

Michael Cicala
INVENTOR.

BY *[signature]*
Attorneys

2,910,800

FISHING LURE

Michael Cicala, Brooklyn, N.Y.

Application September 9, 1957, Serial No. 682,914

1 Claim. (Cl. 43—42.06)

The present invention relates to a fishing lure characterized by a conventional-type fishhook and a readily applicable and removable hollow body which is such in construction that fishhooks of different sizes may be readily and detachably mounted thereon, whereby the one body serves to accommodate a plurality of fishhooks.

Ordinarily one buys a lure with a hook attached, making the cost higher and which often is unsatisfactory when an attempt is made to catch many of the different species of fishes. The instant concept contemplates providing the purchaser with a single hollow body which serves as a container for a gas producing, effervescent tablet or pellet which, on contact with water, is activated, causing gas bubbles to be intermittently emitted through a port provided therefor in the container in a now reasonably well known manner to attract fish. By grooving the surface of the container, the purchaser may employ any one of a number of different sizes of fishhooks and attach the selected one to the body or container. Consequently, one then has a lure for any kind of fish which inhabit salt water or fresh water and whether the fish are game or not. By properly baiting the hook to appeal to the sense of smell of a fish, and activating the container through the medium of the emitted gas bubbles, an over-all efficient lure is had. Experience has shown that a lure constructed as herein disclosed may be efficiently used for attracting and catching almost all types of fish while resorting to varying techniques, such as bottom fishing, trolling, surf casting, and so on.

Other objects, features and advantages will become more readily apparent from the following description and the accompanying drawing.

Figure 1:
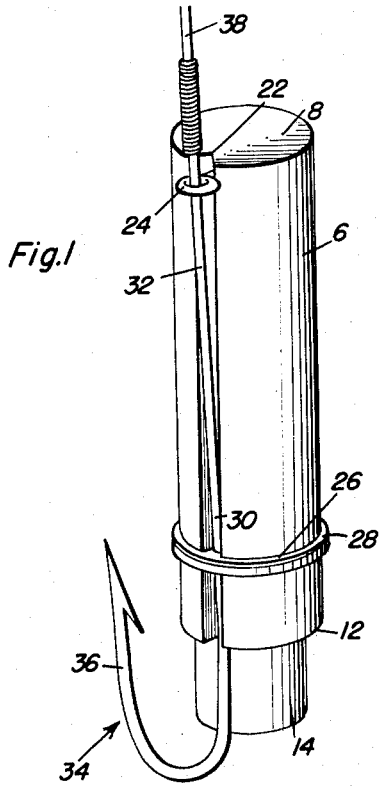
Fig. 1 is a perspective view of a hook-equipped lure constructed in accordance with the invention.
Figure 2:
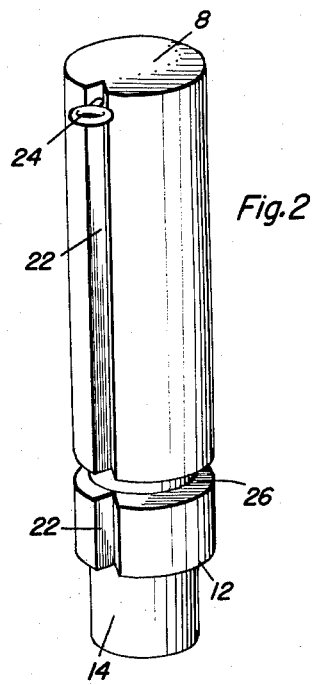
Fig. 2 is a perspective view with the fishhook removed.
Figure 3:
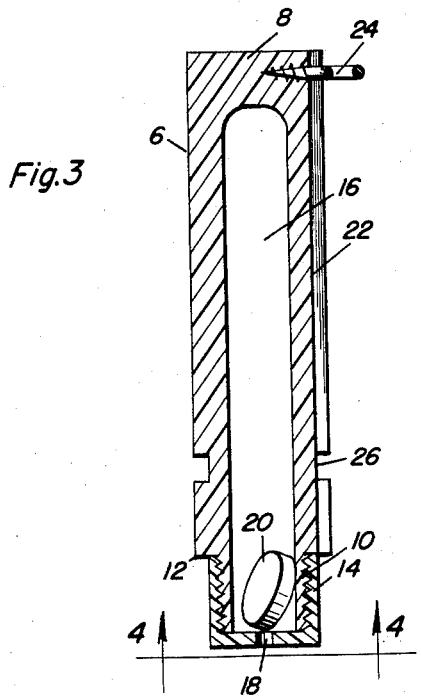
Fig. 3 is a longitudinal sectional view through the construction seen in Fig. 2.
Figure 4:
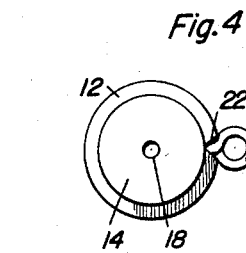
Fig. 4 is a section in end elevation taken on the line 4—4 of Fig. 3.

Referring now to the drawing, the hollow body or elongated container is denoted by the numeral 6 and is of appropriate length and cross-section as well as of suitable material. The flat closed end 8 is of the same diameter as the body proper, while the other end portion is reduced in cross-section to provide an externally screw-threaded neck 10 and a shoulder 12. This neck serves to accommodate a somewhat correspondingly reduced screw cap 14 providing an appropriate closure for the container space 16. The cap is provided centrally with an opening or vent 18 to allow the generated gases to issue or be emitted therefrom. As before mentioned, the gases are produced through the medium of a disintegrable tablet or pellet 20. At the upper or flat end, and located in one end portion of the V-shaped groove 22, there is a lateral outstanding screw eye 24. The lower or opposite end of the groove opens through the shouldered portion 12 and the median portion has an encircling second groove 26. The main groove 22 is V-shaped as mentioned, while the groove 26 is preferably rectangular and provides a receiving and retaining channel for a simple elastic band 28. The band serves to embrace the portion 30 of the shank 32 of a more or less conventional fishhook 34. The hooked or barbed end is denoted at 36 and the shank extends through and beyond the eye or screw eye 24, where it is suitably connected with a leader or to the fishing line 38 in the manner illustrated.

The body portion of the lure may be made of plastics. The V-shaped groove is preferred because it serves to satisfactorily accommodate and appropriately hold the shank of the fishhook therein. Experience has shown that the bubbling action of the lure is unquestionably a reliable aid when using the device as a lure for catching fish. It has been observed that in bottom fishing, where the baited hook is kept on the floor of the water, the baited hook is easily hid from the fish just a few feet away. The bubbling action of the lure is effectually visible and attracts fish, insuring effective catches. It can be placed on the fishing line just ahead of the plug, thereby making the plug more noticeable by the accompanying action resulting from the bubbling and escaping gas bubbles.

The grooved container with the ported cap is thought to be an innovation in this line of endeavor, since it makes it possible for the purchaser to utilize the single container but to employ any number of fishhooks of varying sizes and types, the selected fishhook being attachable to the grooved portion of the body in a satisfactory manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A fishing device comprising an elongated hollow body providing a container which is closed at one end and open at the other end, said other end of said body being provided with a reduced screw-threaded neck defining a shoulder, a closing cap having a gas discharge port, said cap being of a cross-section less than the cross-section of said body and being detachably mounted on said neck and closing said open end, said container being adapted to contain an effervescent pellet which, when wetted, produces a gas with the gas bubbles capable of escaping by way of the port in said cap, the exterior surface of said body being provided with an open-ended, longitudinally extending groove V-shaped in cross-section and also provided a second endless groove at right angles and intersecting a median portion of the first-named groove, said second groove being of sufficient depth to accommodate a readily applicable and removable rubber band, said first-named groove being adapted to accommodate the shank portion of an insertable and removable fish hook, and a screw eye having a screw threaded shank screwed into said body at the aforementioned closed end of the body whereby the eye of the screw is thus aligned with said longitudinally extending groove and so that the eye, upon embracing the shank of the fish hook cooperates with the rubber band in satisfactorily, but removably, mounting the fish hook on said body.

References Cited in the file of this patent

UNITED STATES PATENTS

| | | |
|---|---|---|
| 2,167,335 | Hayes | July 25, 1939 |
| 2,415,742 | Hiltabidel | Feb. 11, 1947 |
| 2,546,772 | Neff | Mar. 27, 1951 |
| 2,547,279 | Patterson | Apr. 3, 1951 |
| 2,573,399 | Cannon | Oct. 30, 1951 |
| 2,599,128 | Roberts | June 3, 1952 |
| 2,765,569 | Claybrook | Oct. 9, 1956 |
| 2,791,058 | Bettini | May 7, 1957 |